Patented June 4, 1940

2,203,121

UNITED STATES PATENT OFFICE 2,203,121

PREPARATION OF DIACETYLDIHYDROMORPHINONE

Philipp Zutavern and Heinrich Metzger, Ludwigshafen-on-the-Rhine, Germany, assignors to E. Bilhuber, Inc., Jersey City, N. J., a corporation of New Jersey No Drawing. Application June 17, 1938, Serial No. 214,308

3 Claims. (Cl. 260—285)

The invention relates to processes for preparing certain acyl derivatives of dihydromorphinone, as well as to the heretofore unknown resulting products which are useful for medicinal purposes. More particularly the invention relates to the production of diacetyldihydromorphinone and the hydrochloric acid salt thereof, which products have been hitherto unknown.

We have discovered that diacetyldihydromorphinone may be produced by treating dihydromorphinone base with an excess of acetic anhydride, resulting in a practically quantitative yield, the excess acetic anhydride being suitably removed, and the base precipitated by the addition of sodium carbonate and recrystallized from its alcoholic solution. It is to be expected that treatment of an alkaloidal ketone such as dihydromorphinone with an acyl anhydride such as acetic anhydride, will result in attaching one acyl radical in ring I in the hydroxyl group, but it is wholly unexpected that a second acyl radical can be attached in ring III which contains the ketone group.

As an example of the production of diacetyldihydromorphinone in the above manner, 30 grams of dihydromorphinone are treated with 80 grams of acetic anhydride, the mix being heated to promote the reaction, for example by being subjected to mild boiling for a period of two hours. The excess anhydride is destroyed by adding water in the form of ice, or the mix may be otherwise suitably kept cool while water is added. The diacetyldihydromorphinone base thus formed is precipitated from the reacted solution by the addition of about 60 grams of sodium carbonate. The precipitate is then mixed with absolute alcohol, filtered and the desired end product recrystallized from its alcoholic solution. The yield is approximately 36 grams. Diacetyldihydromorphinone thus recrystallized from alcohol has a melting point of 160–161° C. In the production of the above compound the reaction may proceed as follows:

To prepare the hydrochloric acid salt of diacetyldihydromorphinone, a solution of diacetyldihydromorphinone in absolute alcohol is neutralized with an alcoholic solution of hydrochloric acid gas, and the resultant product precipitated by the addition of absolute ether. To separate diacetyldihydromorphinone hydrochloride from the unreacted base, the crystalline precipitate is dissolved in methyl alcohol, filtered, and recrystallized from the methyl alcohol solution.

As a specific example, pure diacetyldihydromorphinone crystals obtained as previously described, may be dissolved in absolute alcohol (1 gm. of the base in about 7 cc. of alcohol), the solution being suitably kept cool at this stage, and an absolute alcoholic solution of hydrochloric acid gas is then slowly added until the reaction solution is neutral. By the addition of absolute ether, the diacetyldihydromorphinone hydrochloride product is then precipitated from the reaction solution. The precipitate is then treated with absolute methyl alcohol, filtered to remove the unreacted base, and the desired end product recrystallized from its methyl alcohol solution. Diacetyldihydromorphinone hydrochloride as thus produced, contains one molecule of water of crystallization and the anhydrous salt is hygroscopic and readily soluble in water, its melting point being 150° C.

While certain specific procedures have been disclosed for producing the end products above referred to, it should be understood that changes may be made therein without departing from the invention in its broader aspects, within the scope of the appended claims.

We claim:

1. The chemical product diacetyldihydromorphinone.

2. The chemical product diacetyldihydromorphinone hydrochloride.

3. The new chemical compound selected from the group consisting of diacetyldihydromorphinone and the acid salts thereof.

PHILIPP ZUTAVERN.
HEINRICH METZGER.